United States Patent [19]
Mainker

[11] Patent Number: 5,909,487
[45] Date of Patent: Jun. 1, 1999

[54] AUTOMATIC CALL GENERATOR WITHIN A TELECOMMUNICATIONS SYSTEM

[75] Inventor: Praful Mainker, Garland, Tex.

[73] Assignee: Ericsson, Inc., Research Triangle Park, N.C.

[21] Appl. No.: 08/784,100

[22] Filed: Jan. 15, 1997

[51] Int. Cl.⁶ .............................. H04M 3/42; H04M 3/56
[52] U.S. Cl. .................... 379/209; 379/196; 379/205; 379/219
[58] Field of Search ................... 379/201, 209, 379/215, 210, 211, 219, 220, 221, 205, 202, 203, 204, 265, 196, 197, 198, 93.02, 93.03, 93.04

[56] References Cited

U.S. PATENT DOCUMENTS

| | | | |
|---|---|---|---|
| 4,796,293 | 1/1989 | Blinken et al. | 379/202 |
| 4,969,185 | 11/1990 | Dorst et al. | 379/209 |
| 5,040,208 | 8/1991 | Jolissaint | 379/209 |
| 5,099,510 | 3/1992 | Blinken, Jr. et al. | 379/202 |
| 5,185,782 | 2/1993 | Srinivasan | 379/266 |
| 5,311,574 | 5/1994 | Livanos | 379/209 |
| 5,311,583 | 5/1994 | Friedes et al. | 379/209 |
| 5,408,518 | 4/1995 | Yunoki | 379/202 |
| 5,533,100 | 7/1996 | Bass et al. | 379/209 |
| 5,539,813 | 7/1996 | Jonsson | 379/209 |
| 5,559,876 | 9/1996 | Alperovich | 379/205 |
| 5,579,382 | 11/1996 | Tsukishima . | |
| 5,590,183 | 12/1996 | Yoneda et al. | 379/209 |
| 5,625,682 | 4/1997 | Gray et al. | 379/209 |
| 5,692,033 | 11/1997 | Farris | 379/209 |
| 5,701,295 | 12/1997 | Bales et al. | 379/209 |
| 5,719,928 | 2/1998 | Pinnell et al. | 379/202 |
| 5,740,229 | 4/1998 | Hanson et al. | 379/209 |
| 5,742,674 | 4/1998 | Jain et al. | 379/201 |
| 5,761,289 | 6/1998 | Keshav | 379/201 |
| 5,768,359 | 6/1998 | DiPierro, Jr. et al. | 379/209 |
| 5,802,158 | 9/1998 | Jeong | 379/198 |
| 5,812,652 | 9/1998 | Jodoin et al. | 379/205 |
| 5,812,653 | 9/1998 | Jodoin et al. | 379/205 |

FOREIGN PATENT DOCUMENTS

| | | |
|---|---|---|
| 0435449 | 7/1991 | European Pat. Off. . |
| 0 692 920 A1 | 1/1996 | European Pat. Off. . |
| 0 699 009 A1 | 2/1996 | European Pat. Off. . |
| 61-189759 | 8/1986 | Japan . |
| 03120941 | 5/1991 | Japan . |

OTHER PUBLICATIONS

Method for Automatic Conference Calling by Scheduled Calendar Event, IBM Technical Journal, vol. 37, No. 1, Jan. 1994.

Self–Serve Teleconference Arrangement, IBM Technical Journal, vol. 38, No. 5, May 1995.

PCT Search Report, Jul. 3, 1998, PCT/US 98/00746.

*Primary Examiner*—Scott Wolinsky
*Attorney, Agent, or Firm*—Jenkins & Gilchrist, P.C.

[57] ABSTRACT

An application module associated with a telecommunication exchange serving a particular subscriber stores a directory number representing a called party subscriber and time data representing the time a call connection between the subscriber and the called party subscriber should be established. Thereafter, whenever the specified time represented by the time data occurs, the application module establishes a first call connection with the subscriber, informs the subscriber of the requested call connection, and in response to an affirmative confirmation, establishes a second call connection between the subscriber and the previously indicated called party subscriber. Such call connections can be effectuated in accordance with the subscriber's call setup option, e.g., daily, weekly, monthly, yearly, etc.

24 Claims, 4 Drawing Sheets

AUTOMATIC CALL GENERATOR WITHIN A TELECOMMUNICATIONS SYSTEM

BACKGROUND OF THE INVENTION

1. Technical Field of the Invention

The present invention relates to a telecommunications system and, in particular, to an automatic call-setup subscriber feature within a telecommunications end office.

2. Description of Related Art

As stored program controlled (SPC) switching systems have evolved, a wide variety of useful subscriber features have been developed to extend the communication capabilities such systems provide. One example is call forwarding where a customer provides a forward-to directory number to the switching system and the switching system thereafter forwards all incoming calls for the customer to the provided directory number. Other examples includes call waiting, cancel call waiting, automatic callback, and account codes. However, even with the advancement of such SPC switching systems and provision of subscriber features, manual indications by telecommunications subscribers are, at some point, needed in order to effectuate a call connection with a particular called party subscriber.

Consequently, a subscriber who needs to make an outgoing call connection on a periodic basis is inconvenienced by the fact that he or she needs to remember such a schedule and to manually effectuate an outgoing call request. Such a schedule may reflect the subscriber's personal life, such as anniversaries or birthdays of relatives. The schedule may further reflect the subscriber's business life, such as a regular telephone conference schedule, regular customer follow-up calls, etc. Accordingly, the subscriber needs to remember each and every one of those events or appointments and to inconveniently and repetitively dial directory numbers associated with the desired called party subscriber.

There is a need then for a mechanism within a serving telecommunications network to automatically and conveniently originate a call connection towards a particular called party subscriber at a predetermined time.

SUMMARY OF THE INVENTION

The present invention provides a method and apparatus for automatically establishing a call connection between a subscriber and a particular called party subscriber at a predetermined time. An indication to reserve a call is received from a subscriber at a telecommunications exchange serving the subscriber. The indication includes a directory number associated with a particular called party subscriber, and a time when that particular call connection should be established. Thereafter, whenever that specified time occurs, the telecommunications exchange first calls back the subscriber. In response to the subscriber answering the call back, the telecommunications exchange reminds the subscriber of the scheduled call connection request. Such a reminder can be accomplished via playing an announcement with the reserved called party subscriber directory number. As an alternative, the subscriber has the option of recording his own message and having that recorded message played back as his reminder during the call back. A confirmation is then requested from the subscriber to initiate the call connection. In response to an affirmation confirmation, the telecommunications exchange establishes a call connection with the called party subscriber. In case the called party subscriber is busy or fails to answer the call within a predetermined amount of period, the telecommunications exchange disconnects the call, waits a predetermined amount of time, and attempts the above procedures again until a specified number of attempts has been performed or a successful call connection is established.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
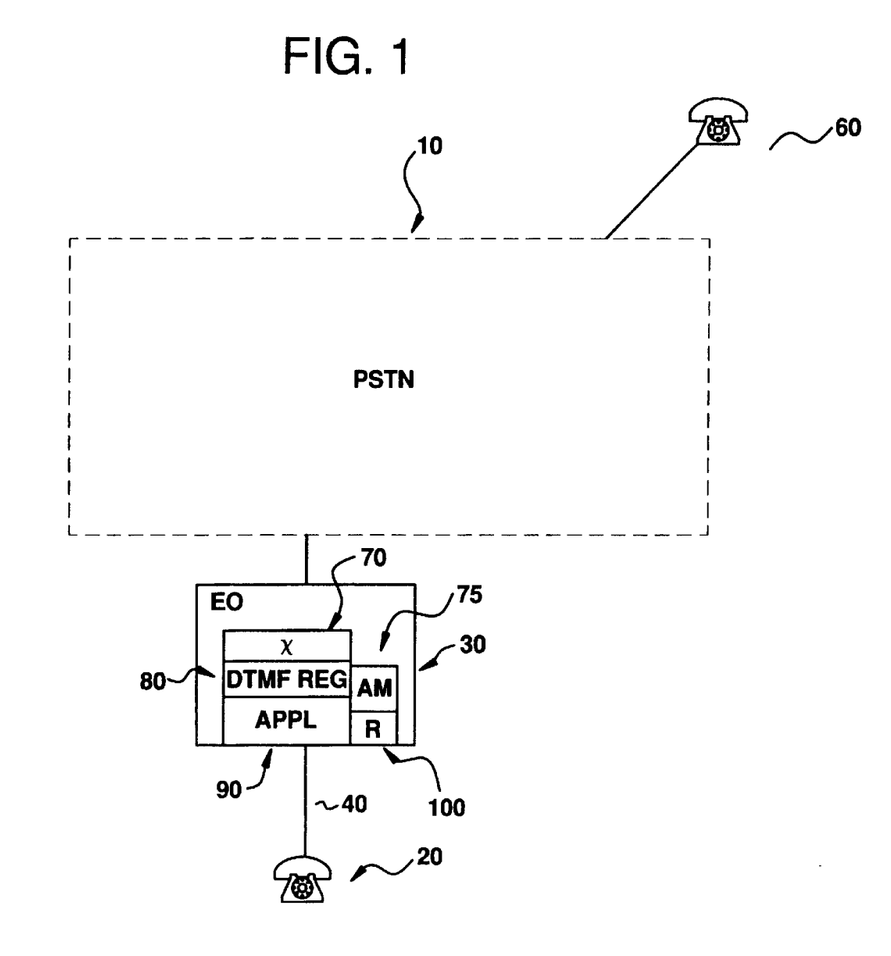
FIG. 1 is a block diagram of a Public Switched Telephone Network (PSTN) illustrating the provision of a telecommunications feature in accordance with the present invention to a subscriber.

FIG. 1 shows a Public Switched Telephone Network (PSTN) 10 in which the present invention, as will be disclosed herein, may be implemented. A wireline subscriber 20 is served by a particular telecommunications exchange or end office (EO) 30 via an access line 40. The telecommunications exchange 30 is, in itself, a part of the PSTN 10 for effectuating communications with other telecommunications subscribers, such as another wireline subscriber 60.

In accordance with the teachings of the present invention, the telecommunications exchange 30 serving the subscriber 20 includes a switch 70 for selectively connecting a first circuit with a second circuit in order to establish a call connection between a first telecommunications terminal and a second telecommunications terminal. The telecommunications exchange 30 further includes a Dual Tone Multi Frequency (DTMF) recognizer 80 for receiving and analyzing DTMF signals input by subscribers. Furthermore, the telecommunications exchange 30 comprises an application module (APPL) 90 for effectuating the automatic call connection in accordance with the teachings of the present invention. The application module 90 is further associated with a memory register 100 for storing data associated with the application module 90.

In accordance with the present invention, the application module receives an indication from a subscriber, such as the wireline subscriber 20, to reserve a call connection at a particular time towards a particular called party subscriber 60. Utilizing the DTMF recognizer 80, the application module 90 receives a directory number representing the desired called party subscriber, and a time associated with the reserved call connection. Such a time may represent a time of day, day of week; a time of day, day of month; or a time of day, day of year. Such received data are then stored at the register (R) 100 and associated with the wireline subscriber 20. Thereafter, the application module 90 monitors a clock (not shown in FIG. 1) to ascertain whether the time input by the wireline subscriber 20 has occurred. In response to an affirmative determination, the application module retrieves the directory number associated with the called party subscriber from the register 100. The application module then calls back the wireline subscriber 20 (hereinafter referred to as a call back). In response to the wireline subscriber 20 answering the call back, the application module informs the subscriber of the scheduled call connection request. The subscriber can be informed via playing an announcement message indicative of the stored called party directory number via an announcement machine 75. As an alterative, the wireline subscriber 20 may also record his or her own voice message at the time of reserving the call and have the recorded voice message played back during the call back to inform the subscriber of the reserved call connection request. The subscriber then confirms the call connection request and, as a result, the application module instructs the switch 70 to establish a call connection between the wireline subscriber 20 and the called party subscriber. As an illustration, for a Signaling System No. 7 (SS7) based telecommunications network, the application module instructs the switch 70 to originate an Integrated Service Digital Network User Part (ISUP) based signal towards the called party subscriber 60. Accordingly, an ISUP based signal, such as an Initial Address Message (IAM), is transmitted with the directory number representing the called party subscriber 60 as the called party address, and the directory number representing the wireline subscriber as the calling party address. The transmitted IAM signal is routed to a local exchange (not shown in FIG. 1) serving the called party subscriber 60 and, as a result, a call connection therebetween is automatically effectuated in accordance with the teachings of the present invention.

Furthermore, until such a call connection request is deleted by the subscriber 20, each time the reserved time occurs, the application module 90 repeatedly performs the aforementioned functions to effectuate a call connection between the subscriber and the indicated called party subscriber.

It will be understood that the description of the present invention in the context of a PSTN telecommunications exchange is by way of explanation of the present invention rather than of limitation of the scope of the invention. The application module can exist within a Public Land Mobile Network (PLMN) telecommunications exchange, such as a Mobile Switching Center (MSC), or a private branch exchange (PBX) for providing the same subscriber feature to other types of terminals and subscribers.

Figure 2:
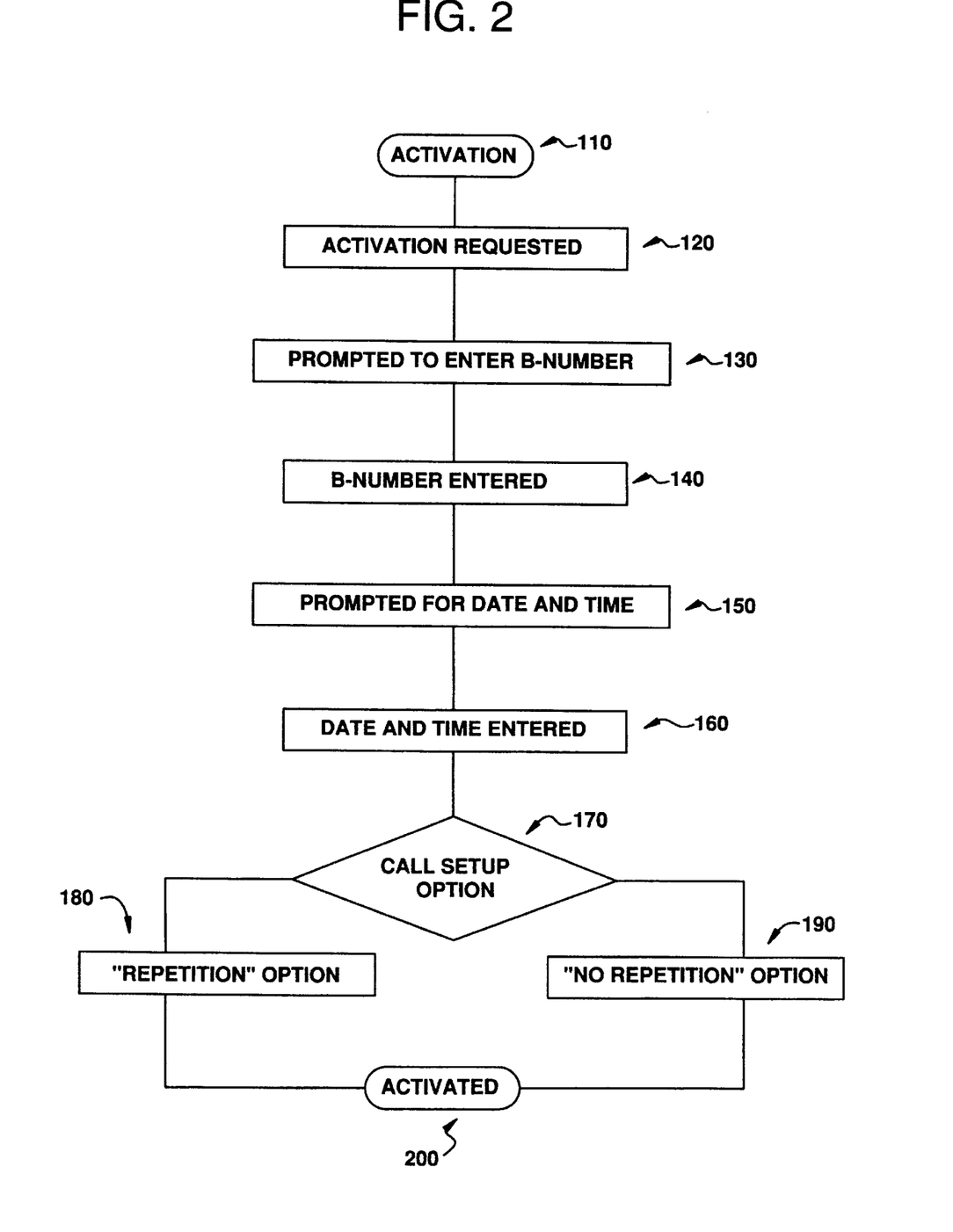
FIG. 2 is a flowchart illustrating the steps performed in order to activate the telecommunications feature for a particular subscriber.

FIG. 2 is a flowchart illustrating the steps performed by the serving telecommunications exchange to activate the telecommunications feature for a particular subscriber. An activation procedure 110 is initiated by a subscriber by dialing a predefined activation service code at step 120. An application module associated with the serving telecommunications exchange determines the identity of directory number associated with the requesting subscriber. Such a determination can be made by ascertaining the subscription record assigned to the line device being utilized by the requesting subscriber. The application module then determines whether the requesting subscriber has subscription to the telecommunications feature. In response to a positive authentication, the application module then prompts the subscriber for a called party directory number (or more commonly known as a B-number) at step 130. The subscriber accordingly enters the B-number. Such a sequence of digits can be entered via DTMF signals using a conventional touch-tone phone and recognized through the DTMF recognizer, or via voice and recognized through a voice recognizer. In response, the application module further prompts the subscriber for a time to establish a call connection with the indicated called party subscriber. As fully described above, such a time may represent: a time of the day, day of the week; a time of the day, day of the month; a time of the day, day of the year. The subscriber then enters the requested time in a similar manner. As an alternative, the subscriber may further be prompted for a personalized message to be later played during a call back at this stage.

At step 170, the application module further requests a call setup option from the subscriber. As an illustration, there are two available options to the subscriber. The subscriber may select a particular "repetition" option at step 180. Such an option includes setting up a call connection hourly, daily, weekly, monthly, yearly, etc.

On the other hand, the subscriber may select a "no repetition" option at step 190 wherein a call connection will not be repeated after the first call connection.

The provided data along with the directory number representing the subscriber are then stored at the register associated with the application module. As a result, an activation has been achieved for the subscriber at step 200.

Figure 3:
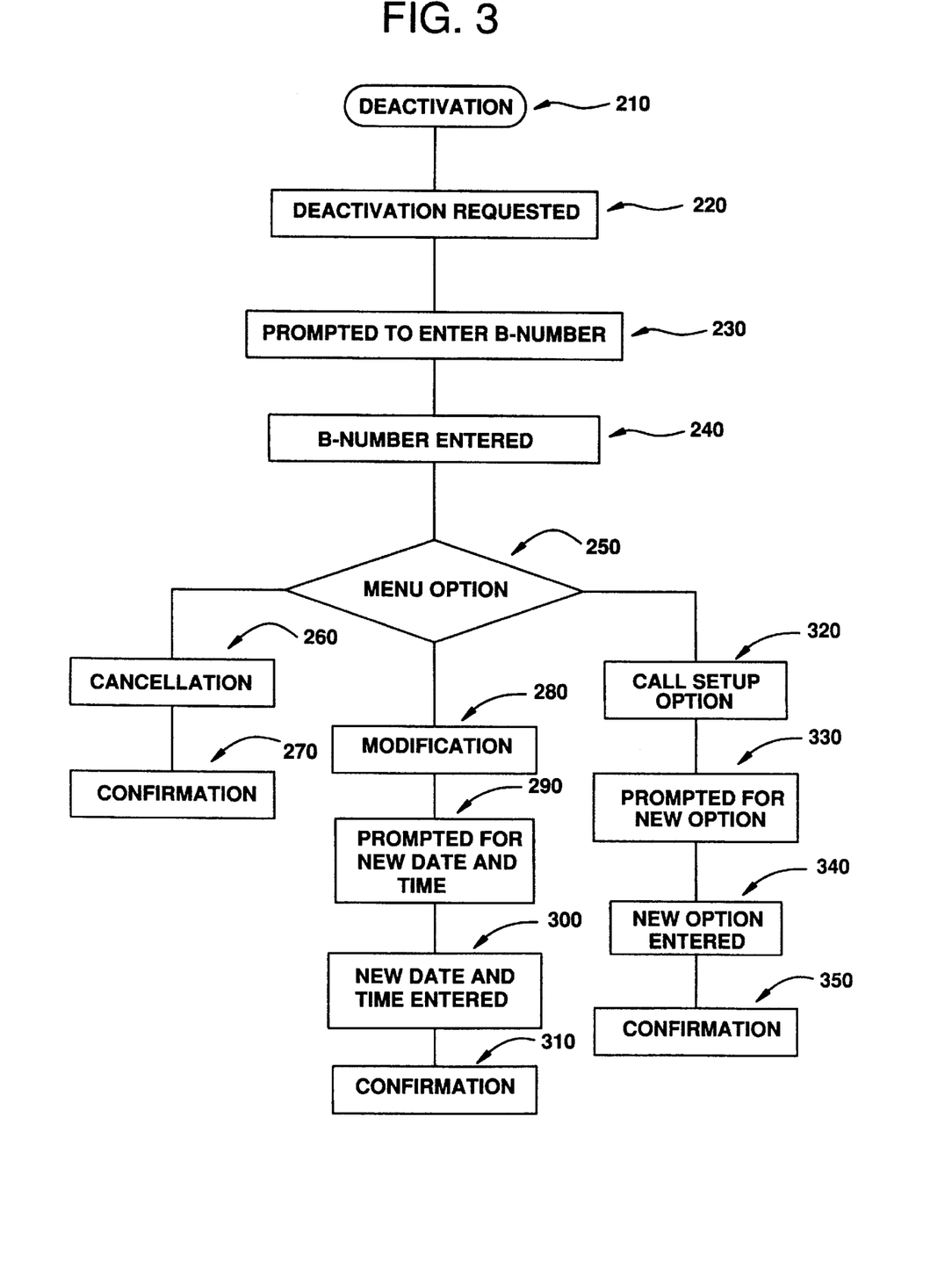
FIG. 3 is a flowchart illustrating the steps performed in order to deactivate or modify the telecommunications feature for the subscriber.

FIG. 3 is a flowchart illustrating the steps performed by the serving telecommunications exchange to deactivate or to modify the telecommunications feature for the subscriber. A deactivation procedure 210 is initiated by the subscriber by dialing a predefined deactivation service code at step 220. Again, usage of the service codes to activate and deactivate the subscriber feature is for exemplary purposes only. A serving telecommunications exchange may easily provide other alternatives to enable subscribers to gain access to the application module. Such an alternative might include providing a directory number (access number) for the feature. Once a subscriber dials the directory number to establish a call connection with the application module, the subscriber may further indicate an activation or deactivation of the subscriber feature by separately inputting additional data, such as DTMF signal or voice data.

The application module then prompts the subscriber for a particular B-number at step 230. In response, the subscriber enters a B-number associated with the reserved call connection request to deactivate at step 240. The application module then reviews the register and determines that there exists a reserved call connection towards that particular B-number for the deactivating subscriber. The application module then provides a menu option to the subscriber at step 250. The subscriber may cancel the reserved call connection request at step 260. A confirmation to that effect is then provided to the subscriber at step 270.

The subscriber may also select a modification option at step 280. The subscriber is then prompted for a new date and time of the call connection request at step 290. The amended time is then received from the subscriber and stored at the register by the application module at step 300. A confirmation to that effect is further provided to the subscriber at step 310.

The subscriber may also select a call setup option at step 320. As a result, the application module prompts the subscriber for a new call setup option at step 330. The application module then receives the amended call setup option from the subscriber and stores the received data at the register at step 340. As an example, the subscriber may change the call setup option to have the call connection be repeatedly established on a monthly basis instead of a weekly basis. Lastly, a confirmation to that effect is further provided to the subscriber at step 350.

Figure 4:
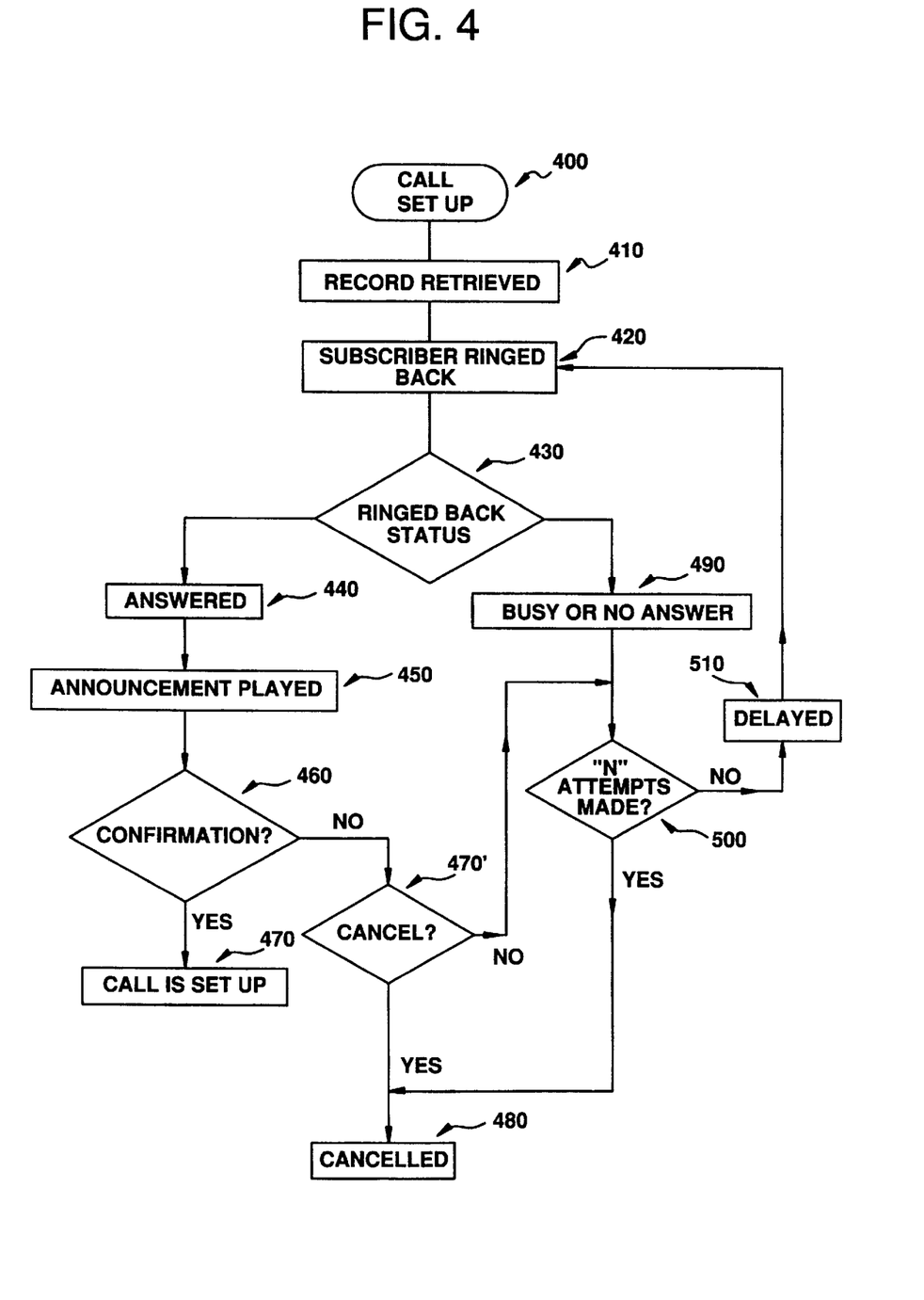
FIG. 4 is a flowchart illustrating the steps performed in order to establish a call connection between the subscriber and a called party subscriber in accordance with the teachings of the present invention.

FIG. 4 is a flowchart illustrating the steps performed by the serving telecommunications exchange to establish a call connection between the subscriber and a called party subscriber in accordance with the teachings of the present invention. A call setup procedure is initiated by the application module determining that the specified time for a particular registration has occurred at step 400. The application module then retrieves the associated data (record) from the register at step 410. The retrieved data include the directory number associated with the indicated called party subscriber and the directory number associated with the requesting subscriber. Using the retrieved directory number, the application module instructs the switch to first establish a call connection with the subscriber at step 420 (call back). The ring back status of the call back is then ascertained at step 430. If the subscriber is either busy or failing to answer the call back for a predetermined amount of period at step 490, the application module disconnects the call connection therebetween. The application module then increments the counter representing the number of attempts made by the application module for this particular request by one. The application module then evaluates the counter to determine whether a maximum number of attempts imposed by the telecommunications exchange has been exceeded towards this request. In response to a negative determination (NO decision branch), the application module waits a predetermined amount of delay period at step 510. After the expiration of the imposed delay period, the application module re-performs the call back procedure from step 420 until the call back is answered or the number of attempts have exceeded the limit imposed by the telecommunications exchange. If the limit has been reached, the request for call connection for this particular time period is canceled at step 480. Therefore, if the subscriber has selected the "repetition" option, the application module waits for the next occurrence of the indicated time.

The maximum limit imposed on the number of attempts may be specified by the subscriber or by a service provider associated with the serving telecommunications exchange.

On the other hand, if the call back is answered by the subscriber at step 440, a speech connection between the subscriber and the serving telecommunications exchange is established. The application module then attempts to remind the subscriber of the requested call connection by playing an announcement message indicative of the reserved called party number. An synthesized voice player, well known in the communication field, reads the called party directory number from the register and provides synthesized voice informing the subscriber of the called party directory number over the established call connection. An additional system message may further be generated to inform the subscriber of the requested call connection. As an example, a message stating that "your previously requested call connection to (subscriber provided directory number) will be attempted now" can be played. As an alternative, the previously recorded subscriber's personal message may be played.

The application module then prompts the subscriber for a confirmation to proceed with the call connection at step 460. In response to an affirmative confirmation (YES decision branch), the application module instructs the switch to setup a call connection between the subscriber and the indicated called party subscriber at step 470. As a result, the subscriber hears the result of the call setup, such as a ring tone, and a speech connection is effectuated therebetween.

On the other hand, if the subscriber instructs the application module to discontinue with the call setup procedure (NO decision link) at step 460, the application module further prompts the subscriber to ascertain whether the subscriber wishes to cancel the request or to delay the call setup until later at step 470. If the subscriber instructs the application module to cancel the request, the request is canceled by the application module at step 480 and no further attempts are made for this particular time period towards the called party subscriber.

However, if the subscriber is temporarily unavailable to make the call and wishes to delay the call setup (NO decision link), the application module again increments the call setup counter and determines whether the maximum number of call setup imposed by the telecommunications exchange has been exceeded at step 500. If the number has exceeded the imposed limit, the request is canceled by the application module at step 480. On the other hand, if the limit has not been reached yet, the application module again waits for the specified delay period at step 510. Upon expiration of the delay period, the application module again attempts to effectuate the call setup by calling back the subscriber at step 420.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call connection between a calling subscriber and a called party subscriber within a telecommunications system, said method comprising the steps of:

a) receiving a predefined activation service code from said calling subscriber, said code corresponding to a service for making an automatic call connection request;

b) in response to receiving said code, authenticating said calling subscriber by determining a first directory number of said calling subscriber, and upon positive authentication:

c) storing a second directory number of said called party subscriber indicated by said calling subscriber at a telecommunications exchange which services said calling subscriber;

d) storing a time value associated with said second directory number, said time value corresponding to any predetermined point in time indicated by said calling subscriber for establishing said call connection;

e) determining that said predetermined point in time corresponding to said time value has been reached;

f) originating a first call back from said telecommunications exchange to said calling subscriber;

g) confirming that said calling subscriber has answered said first call back;

h) originating a second call back to said called party subscriber at said retrieved second directory number; and i) connecting said first call back to said second call back to establish said call connection between said calling subscriber and said called party subscriber.

2. The method of claim 1 wherein said time value represents a particular time of day and day of week.

3. The method of claim 1 wherein said time value represents a particular time of day and day of year.

4. The method of claim 1 wherein said confirming step g) further comprises the steps of:

g1) confirming that said calling subscriber wishes to establish said call connection; and g2) establishing said call connection.

5. The method of claim 4 wherein said confirming step g) further comprises the steps of:

playing an announcement message to said calling subscriber informing said subscriber that said point in time for establishing said call connection has been reached; and performing steps g1) and g2) of claim 4.

6. The method of claim 5, further comprising the steps of:

in response to a negative confirmation, determining whether said calling subscriber wishes to cancel the establishment of said call connection; and in response to an affirmative determination, canceling the establishment of said call connection;

otherwise, determining whether a number of attempts specified by said telecommunications exchange has been exceeded;

in response to a negative determination, waiting a particular period predefined by said telecommunications exchange; and performing steps f)–i) of claim 1 after the expiration of said period.

7. The method of claim 1 further comprising the steps of:

determining that said calling subscriber is either busy or non-responsive to said first call back;

determining that a number of attempts specified by said telecommunications exchange has not yet been exceeded;

waiting a particular period predefined within said telecommunications exchange; and reattempting the origination of said first call back after the expiration of said period.

8. A method for establishing a call connection within a telecommunications system between a calling subscriber and a called party subscriber, said method comprising the steps of:

a) receiving a predefined activation service code from said calling subscriber, said code corresponding to a service for making an automatic call connection request;

b) in response to receiving said code, authenticating said calling subscriber by determining a first directory number of said calling subscriber, and upon positive authentication:

c) receiving an indication from said calling subscriber to establish a call connection towards said called party subscriber at any predetermined point in time indicated by said calling subscriber;

d) determining that said predetermined point in time has been reached; and e) establishing a call connection automatically between said calling subscriber and said called party subscriber.

9. The method of claim 8 wherein said step of establishing said call connection further comprises the steps of;

establishing a first call connection from said telecommunications system to said calling subscriber;

recognizing that said calling subsscriber has answered said call conection;

establishing a second call connection from said telecommunications sytem to said called party subscriber; and connecting said first call connection with said second call connection.

10. The method of claim 9 wherein said step of recognizing that said calling subscriber has answered said call connection further comprises the steps of:

informing said calling subscriber of a scheduled call connection request towards said called party subscriber;

requesting a confirmation from said calling subscriber; and in response to an affirmative confirmation, establishing said second call connection;

otherwise, disconnecting said first call connection;

waiting a particular period specified by said telecommunications system; and repeating the steps of claim 9.

11. The method of claim 9, wherein in response to said calling subscriber being busy or not answering said first call connection, further comprising the steps of:

determining whether a number of attempts specified by said telecommunications system has been attempted; and in response to a negative determination, waiting a particular period specified by said telecommunications system; and repeating said steps of claim 9;

otherwise removing said indication from said telecommunications system.

12. An apparatus for establishing a call connection between a calling subscriber and a called party subscriber within a telecommunications system, comprising:

an authentication module for receiving a predefined activation service code from said calling subscriber, said code corresponding to a service for making an automatic call connection request, and in response to receiving said code, authenticating said calling subscriber by determining a first directory number of said calling subscriber;

a register for storing a second directory number indicated by said calling subscriber, said time value indicated by said calling subscriber, said time value corresponding to any point in time indicated for establishing said call connection;

a switch for establishing said call connection; and an application module for determining that said point in time corresponding to said time value has been reached and for instructing said switch to establish said call connection between said calling subscriber and said called party subscriber.

13. The apparatus of claim 12 wherein said time value represents a particular time of day and day of week.

14. The apparatus of claim 12 wherein said time value represents a particular time of day and day of year.

15. The apparatus of claim 12 wherein said application module in establishing said call connection further instructs said switch to:

a) originate a first call back to said calling subscriber; and b) in response to said calling subscriber answering said call back, originate a second call back to said called party subscriber and connect said first and second call backs.

16. The apparatus of claim 15 wherein said application module further instructs said switch to:

play an announcement message to said calling subscriber informing said calling subscriber of a scheduled call connection towards said called party subscriber;

request a confirmation from said calling subscriber of said scheduled call connection; and in response to an affirmative confirmation, perform steps a)–b) of claim 15.

17. The apparatus of claim 16, wherein said application module, in response to a negative confirmation, further instructs said switch to:

determine whether said calling subscriber wishes to cancel said call connection; and in response to an affirmative determination, cancel said call connection;

otherwise, determine whether a number of attempts specified by said application module has been exhausted;

in response to a negative determination, wait a particular period predefined by said telecommunications exchange; and perform steps a)–b) of claim 16 after the expiration of said period.

18. The apparatus of claim 15 wherein said application module further instructs said switch to:

determine that said calling subscriber is either busy or non-responsive to said call back;

determine that a number of attempts specified by said application module has not yet been exhausted;

wait a particular period predefined within said telecommunications exchange; and perform steps a)–b) of claim 15 after the expiration of said period.

19. A telecommunications system for automatically establishing a call connection between a first and a second telecommunications terminal comprising:

a telecommunications exchange configured to:

receive an identity and a predefined service activation code from said first telecommunications terminal, said predefined service activation code corresponding to a service for making an automatic call connection request;

authenticate, in response to the receipt of said code, said first telecommunication terminal according to a subscription record associated with said first telecommunications terminal;

store a directory number indicated by said first telecommunications terminal, said directory number associated with said second telecommunications terminal;

store a time value associated with said directory number, said time value corresponding to any point in time indicated by said first telecommunications terminal for establishing said call connection;

determine that said point in time corresponding to said time value has been reached; and establish said call connection between said first and said second telecommunications terminals.

20. The telecommunication system of claim 19 wherein said exchange, in establishing said call connection between said first and said second telecommunications terminals, is further configured to:

a) originate a first call back to said first telecommunications terminal;

b) originate a second call back to said second telecommunications terminal in response to said first telecommunication answering said first call back; and c) connect said first and second call backs to establish said call connection between said first and second telecommunications terminals.

21. The telecommunication system of claim 20 wherein said exchange, in originating said first call back to said first telecommunications terminal is further configured to:

determine that said first telecommunications terminal is either busy or non-responsive to said call back; and after a predetermined period of time:

perform steps a)–c) of claim 20.

22. The telecommunication system of claim 20 wherein said exchange, in establishing said call connection, is further configured to:

originate a first call back to said first telecommunications terminal;

communicate a message to said first telecommunications terminal indicating the existence of said automatic call connection request;

request a confirmation from said first telecommunications terminal of said automatic call connection request; and in response to an affirmative confirmation:

originate a second call back to said second telecommunications terminal; and connect said first and second call backs to establish said call connection between said first and second telecommunications terminals.

23. The telecommunications system of claim 22, wherein said exchange, in response to a negative confirmation, is further configured to:

request from said first telecommunications terminal a cancellation indication of said call connection request; and in response to an affirmative indication, cancel said call connection request.

24. The telecommunications system of claim 23, wherein said exchange, in response to a negative indication and after the expiration of a predetermined period of time, is further configured to:

originate a first call back to said first telecommunications terminal;

originate a second call back to said second telecommunications terminal in response to said first telecommunications terminal answering said first call back; and connect said first and second call backs to establish a call connection between said first and said second telecommunications terminals.

* * * * *

UNITED STATES PATENT AND TRADEMARK OFFICE
CERTIFICATE OF CORRECTION

PATENT NO. : 5,909,487
DATED : Jun. 1, 1999
INVENTOR(S) : Mainker

It is certified that error appears in the above-identified patent and that said Letters Patent is hereby corrected as shown below:

Column 7, line 62    Replace "subsscriber"
                     With --subscriber--

Column 7, line 63    Replace "conection"
                     With --connection--

Column 7, line 65    Replace "sytem"
                     With --system--

Signed and Sealed this

Twenty-fifth Day of January, 2000

Attest:

Attesting Officer

Acting Commissioner of Patents and Trademarks